Nov. 11, 1941.     A. L. STONE     2,262,211
TOOL JOINT FOR WELL PIPE
Filed March 18, 1940     3 Sheets-Sheet 2
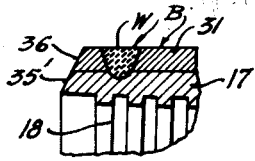
Fig. 7.
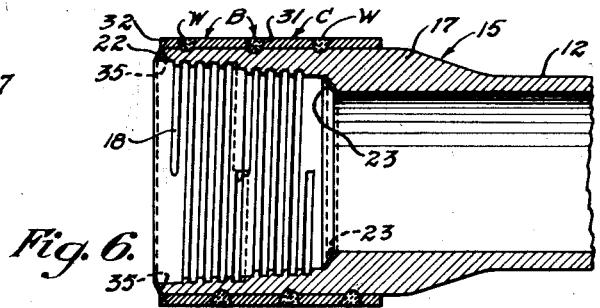
Fig. 6.
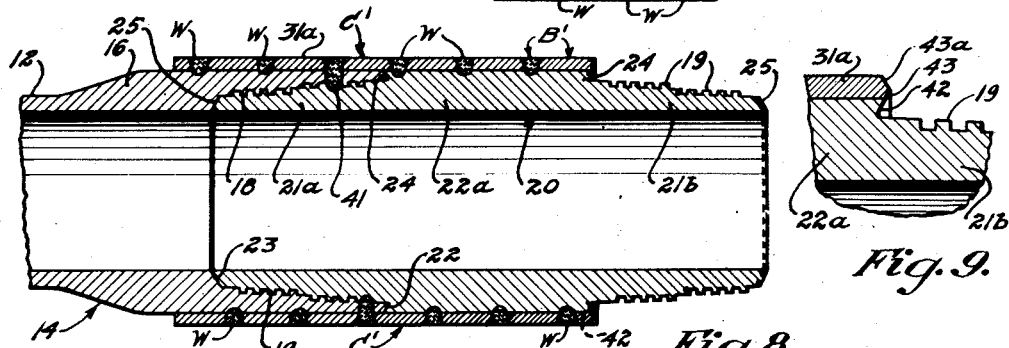
Fig. 8.    Fig. 9.
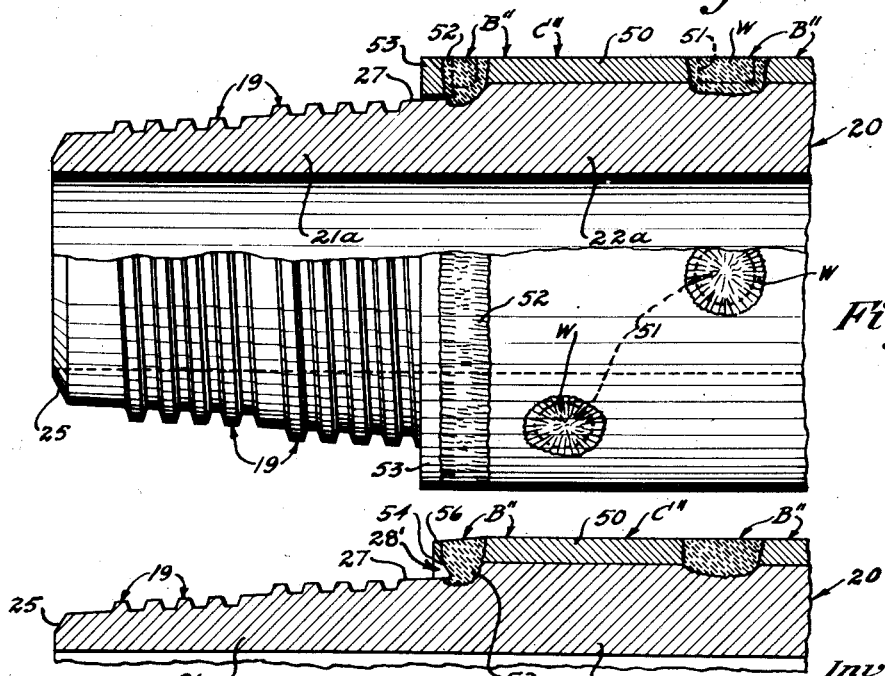
Fig. 10.
Fig. 11.
Inventor.
Albert L. Stone.
Attorneys.

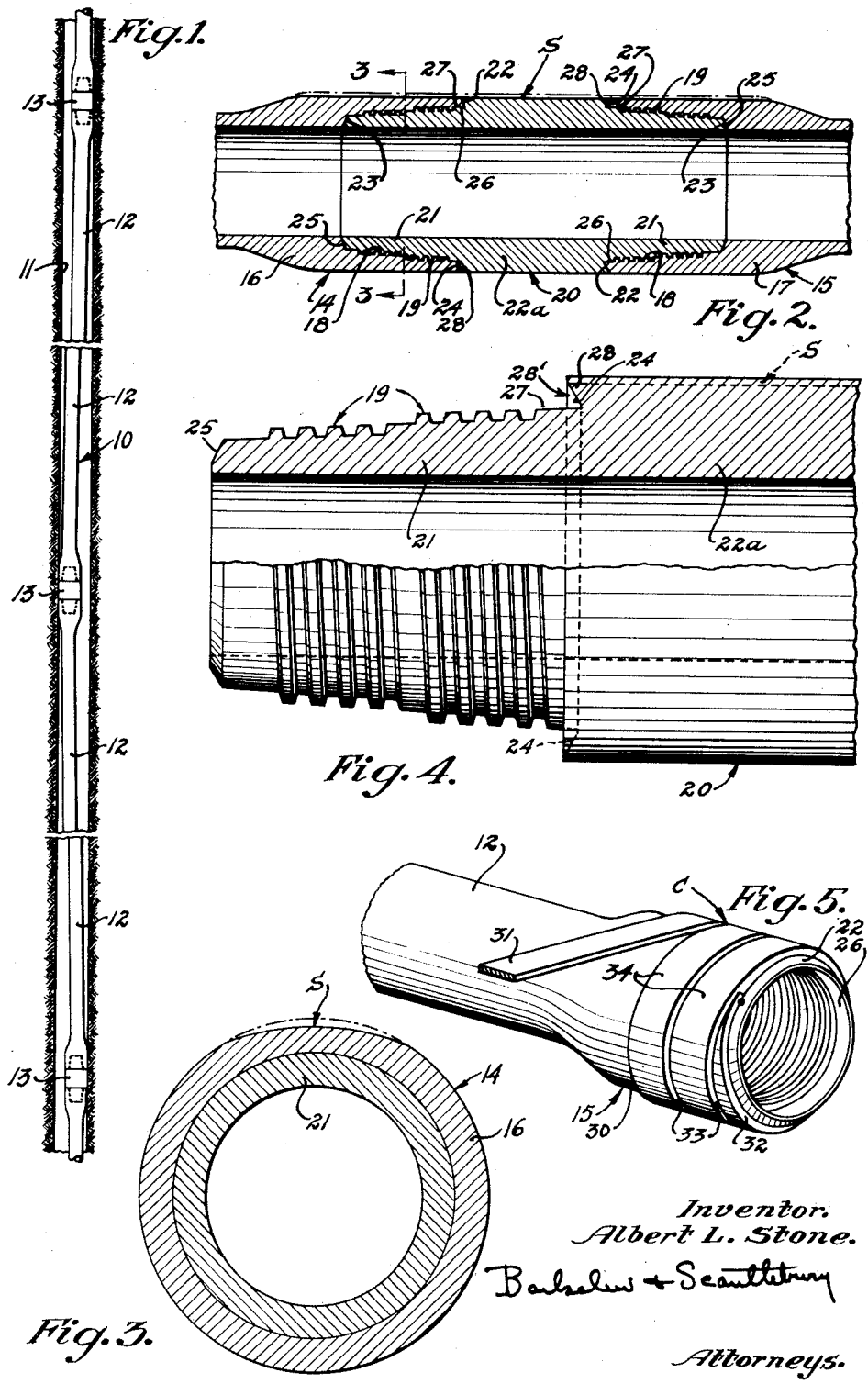
Nov. 11, 1941. A. L. STONE 2,262,211
TOOL JOINT FOR WELL PIPE
Filed March 18, 1940 3 Sheets-Sheet 1

Nov. 11, 1941.   A. L. STONE   2,262,211

TOOL JOINT FOR WELL PIPE

Filed March 18, 1940   3 Sheets-Sheet 3

Inventor.
Albert L. Stone.

Barkelew & Scantlebury

Attorneys.

Patented Nov. 11, 1941

2,262,211

UNITED STATES PATENT OFFICE 2,262,211

TOOL JOINT FOR WELL PIPE

Albert L. Stone, Palos Verdes Estates, Calif., assignor to Hydril Company, Los Angeles, Calif., a corporation of Nevada Application March 18, 1940, Serial No. 324,547

3 Claims. (Cl. 308—4)

This invention relates generally to tool joints for well pipe, and is more particularly concerned with composite or built-up tool joints, whether said joints are composited or built up as a matter of reconditioning or as a matter of original fabrication.

This application is, in part, a continuation of my copending application entitled "Protection and reconditioning of well pipe joints," Ser. No. 225,362, filed August 17, 1938 (which is a continuation-in-part of my application entitled "Protection and repair of drill pipe, joints, subs and the like, filed December 27, 1937, Ser. No. 181,975) and is, in part, a continuation of my copending application entitled "Method of reconditioning tubular joint members and members as so reconditioned, filed Sept. 25, 1939, Ser. No. 296,452.

Generally, it is the object of the invention to provide joints of this character which will effectively and economically serve their purpose under the extremely severe conditions to which such joints are exposed in present day high-speed, open-hole drilling. However, the nature of the invention is such that the detailed objects and features of novelty may be pointed out to better advantage in the following specifications. Reference will be had to the accompanying drawings, in which:

Fig. 1 shows schematically a length of drilling string within an "open-hole" well bore, illustrating a condition which brings about a particular type of wear on the pipe joint;

Fig. 2 is a longitudinal medial section through a worn tool-joint;

Fig. 3 is an enlarged section on line 3—3 of Fig. 2;

Fig. 4 is an enlarged fragmentary elevation, partly in section, of the pin end of an unworn tool joint of a type used prior to my invention, showing in dotted lines how peripheral wear may develop;

Fig. 5 is a diagrammatic perspective illustrating one mode of application of a wear-resistant element;

Fig. 6 illustrates a step in one method of reconditioning a box wherein the sheathing is to form a part of a load-taking shoulder;

Fig. 7 is a fragmentary detail showing the re-formed end shoulder of the box in Fig. 6;

Fig. 8 shows a step in a variational method of reconditioning the pin end of a joint;

Fig. 9 is an enlarged, fragmentary detail showing the re-formed end shoulder of the pin member end in Fig. 8;

Fig. 10 is a fragmentary elevation, partly in section, showing a step in a variational method of building up or reconditioning a worn tool joint member;

Fig. 11 is a fragmentary section illustrating the joint member of Fig. 10 as finally reconditioned;

Figure 13:
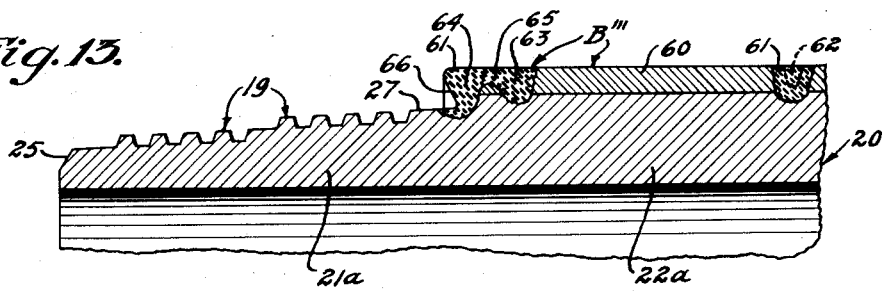
Fig. 13 is a fragmentary section showing another type of built-up joint member.

As is well known, tool joints are employed for coupling adjacent "stands" of drill pipe or for coupling tools or special pipe-sections to drill pipe, the threaded coupling between joint members being of the "quick make-and-break" type. It is universally recognized that such joints must be capable of taking terrific tension and torsional stresses and strains during drilling operations and must take very considerable tong abuse and withstand very considerable torsional stresses during making and breaking operations. In spite of those conditions the joints must be susceptible of being easily and quickly broken and made up when the relatively frequent occasions for performing such operations arise.

The terrific tensile strains on such joints can be readily appreciated when it is realized that joints near the upper end of a string of 3½" O. D. drill pipe about 15,000 feet in length, have to support a weight of about 120 tons. Then, when it is realized that the rotary drive is applied to the string at a point almost three miles above the cutting tool and this rotary drive has to be transmitted through all this length of pipe, the source of the terrific torsional stresses becomes apparent. This necessarily implies ample thickness of stock of the joint, but, to accommodate the variance in diameter at the opposite ends of any thread of a quick detachable type, there is necessarily provided extra originally available thickness of metal at the joint.

Thus it has become characteristic of tool joints that they are of greater thickness than the body of the pipe.

At this point, I wish to make it clear that I refer to tool joints as including a pin member coupled by a quick detachable thread to a box member. Whether the joint members are integrally attached or detachably connected to the associated pipe length is of no importance in these general considerations and the showing of one type or another in the illustrative embodiments of the invention, is not at all to be construed as limitative on the claims.

With it thus established that the tool joint must be relatively thick, it follows that either the inside diameter of the joint must be less than that of the body of the pipe, or the outside diameter of the joint must be greater than that of the body of the pipe, or both conditions may prevail. At the same time it is of extreme importance, as is well recognized, that the outside diameters must be kept as small and the inside diameters as large, as is possible. Inside restrictions have been found to be particularly disadvantageous because they interfere with or prevent the passage of tools or implements through the bore of the string and very undesirably choke down the flow of circulating fluid.

Therefore it may be accepted that the extra thickness of tool joints is provided for in the greatest, by far, number of cases by increasing their outside diameters beyond that of the body of the pipe. Whether this is done by externally upsetting the end of a pipe or by using a thicker-walled, detachable tool joint member, is unimportant to the broader considerations here had, and the illustrative showing of the invention in this regard is not to be construed as limitative on the broader aspects of the invention.

Now there are necessarily opposed annular shoulders on the relatively thick portions of the two joint members, which shoulders must be adapted to take a part of the torsional load incident to make-up and drilling operation and, under most conditions, to form fluid tight joint. Hence, these shoulders must be very accurately located and fashioned and they must be capable of withstanding very considerable loads and abuse without disturbing this accuracy.

With all these conditions prevailing it will be seen that the joints represent diametrically enlarged protuberances at spaced intervals along the drill stem. When the stem is of any appreciable length, it is relatively limber and whips about in a manner periodically to wipe or thud against the defining wall of the bore through which it is passed. Especially in the presence of the usual abrasive, mud-laden circulating fluid, this causes exceedingly rapid wear on the joints, with all the attendant hazards of weakened joints and expense of replacement or repair.

All this was serious enough during the earlier practice of drilling through casing, but upon the comparatively recent advent of extended open-hole drilling all these conditions have become aggravated. The usual protective measures, such as rubber collars interposed between drill stem and casing, are not feasible between drill stem and the wall of an open hole. Naturally, this greatly increased the wear on the tool joints, but to aggravate things further, at about the same time the rotary drilling speed was stepped up about five hundred percent and circulating mud velocities were appreciably increased. With the increased speed of rotation, the increased velocity of the abrasive mud as it was forced upwardly about the drill stem, and the abrasive action of the surrounding rock structure, the unprotected tool joints were exposed to wear conditions that they simply could not stand for any appreciable time. In fact, where, under old conditions, some tool joints lasted for over 300,000 feet of drilled hole, under modern conditions of high-speed, open-hole drilling, the same type of joints have lasted for as little as only 500 feet of drilled hole.

This naturally had extremely serious and, in fact, critical economic effects, calling for an immediate remedy.

The condition was particularly serious in connection with so-called "Hydril" joints, where the "quick-detachable" threads are of the two-step type, the pin member is double-ended, the box members of the joints are integral with the end of the associated pipe-length, and the external mating shoulders play a very particular part in the operation of the joint. Such joints are typified by the showing in Patent #1,932,427—issued to Frederick Stone, October 31, 1933, on "Well pipe joint," except that in the patent the upset is externally flush rather than internally flush and externally protuberant.

Because this "Hydril" joint lends itself particularly well to an explanation of the difficulties spoken of above and to an explanation of the solution represented by this invention, I have confined my drawings and will hereinafter confine my discussion to this type of joint, but it is to be emphasized that this choice is in no way to be taken as limitative on the invention considered in its broader aspects.

To cure the almost disastrous effects spoken of above, it became evident that the joints must be thickened to render them more effectively resistant to the overly severe operating conditions and to make available added stock to compensate for the added wear and thus lengthen the useful life of the joints to an acceptable span.

Since the volumetric capacity of the stem had to be kept at a maximum to accommodate the increased flow of circulating fluid, the extra thickness had to be provided externally. To save the many thousands of joints already in use or in stock, it meant that metal had to be added to the joints, while to insure that newly manufactured joints might have proper characteristics, it meant that the body portions thereof must initially be thicker than originally planned.

But to apply extra metal to pre-formed, completed joints or to originally build up new joints having added thickness, involved other serious problems. In the first place, it was essentially that the body portions and threaded portions have certain relatively narrow-range degrees of hardness and these ranges differed for the body portions and threaded portions. The joints already manufactured had these characteristics, and the building-up operation must not harmfully disturb those conditions nor decrease their predetermined fatigue resistance.

On the other hand, the problem of making up new joints had other angles. With the pin portions remaining of the same thickness as before but the body portions of greater thickness, it appeared impossible to secure the requisite differential in hardness and yet maintain other characteristics as to tensile strength etc., within allowable limits. This came about because of unusual metallurgical reactions dependent upon structure changes during heat treatment of alloy steels having characteristics otherwise desirable or necessary to a tool joint. While these reactions need not be discussed here, their recognition led to a conclusion that even in making up new joints, it was advisable to gain the added thickness by applying a sheathing to a tubular core, the threaded portions being on the core which would thus be relatively thin but of approximate uniform thickness and hence relatively easily heat-treated to give the threaded portions proper hardness characteristics, while the sheathing would also be of substantially uniform thickness and thus easily heat-treated to give it the required hardness properly to withstand the service conditions which were formerly taken by the exposed body portion of the joint.

But in applying the sheathing either to an already manufactured joint, used or not, or to a newly manufactured joint, it was essential that the bond between base metal and sheathing be of a character that would resist the extremely high tensile and torsional stresses tending to tear the sheathing from the base metal and to which stresses the built-up joint would be exposed during drilling operations. At the same time, the sheathing must be such that it would properly take make-up tongs and, during make-up or breaking operations, would withstand the biting and tearing punishment usual to tong operation (it being realized that torque of several hundred foot pounds is not unusual in setting up or breaking joints) and which would also resist the tendency of the sheathing to be bodily rotated with respect to the body metal or core and thus to rupture the bond under the application of these high forces.

So the bond had to be exceedingly secure and yet, in the making, must not involve a serious disturbance of the hardness and other predetermined characteristics of the joint-parts.

My aforesaid application, Ser. No. 225,362 points out how this was accomplished and broadly claims a joint as so fashioned. Generally, it involves the weld-integration of a sheathing to the body of the joint, the weld-integration being non-continuous so far as the full area of surface-to-surface contact of the base metal and sheathing is concerned, and the sheathing extending from a point near one end of a threaded portion to a distance sufficient to give a sheathing-extent of a length to take the tongs in a proper manner.

As a particular feature, it is highly desirable in certain situations that the opposed ends of the built-up portions on the two joint elements form in part, at least, the annular mating and load-taking shoulders of which I have spoken above. And, where the pin member is of the double-ended type, with an annular shoulder at each end of the body portion, it is often of advantage to have the built-up portion of the body run from shoulder to shoulder with the shoulders actually formed of the built-on metal.

Thus, the joint member as finally fabricated (whether based on a previously manufactured joint, used or not, or on a joint member newly manufactured, in toto) may be considered as made up of a body member having a threaded portion at one end, at least, and a radially built-up portion on the body comprising a sheath of wear-resistant metal and weld material, likewise preferably of wear-resistant material, which integrates the sheath and the body at spaced points, at least one end of the built-up portion near one end of a threaded portion forming an annular, load-taking shoulder. In some cases it is the end of the sheath, proper, that forms a part of the shoulder, in other cases it may be a part of the weld material (making up a part of the built-up portion) which forms a part or all of the shoulder, and in still other cases the built-up shoulder may be composed partially of the sheathing and partially of the weld material.

The sheathing may take various forms, for instance, as a solid sleeve, or as a coil, or any of the forms shown in said aforementioned applications.

It is especially to the features of the shoulder make-up in conjunction with the other elements of the built-up joint member, that the claims of the present application are directed.

In the following descriptions of certain individual views, reference will be made to repair or reconditioning of joints and, in connection with other views, reference will be made to initial fabrication of built-up joints. But it is to be understood that it is with a completed, built-up joint that we are here fundamentally concerned and therefore that the showings of the completed joints, irrespective of the nature of the individual descriptions of the steps in the method of making, may be considered broadly as the result of a building-up or compositing process whether done for the purpose of repair, reconditioning or original fabrication. Thus, for instance, though a given finished joint may have been specifically described as the result of a repair job, the same joint may be broadly considered as representing an originally fabricated joint, or vice versa.

Likewise, while I have shown a particular type of shoulder formation associated with a sheathing of a certain type, it will be understood these characteristics may be considered as interchangeable.

In Fig. 1 I have shown a drilling string 10 within an "open-hole" well bore 11, the string being made up of pipe lengths 12 and joints 13. Referring to Figs. 2 and 4, it will be seen that the illustrated joints are of the general type described in connection with Patent No. 1,932,427, mentioned above, except that the patent shows the box end of the joint as internally upset, whereas the instant showing is that of an externally upset box. However, in both instances the box member of the joint is integral with a pipe-length. In the present case, the oppositely disposed boxes 14 and 15 are similar and are externally upset at 16 and 17, respectively, the upsets being provided with internal, two-step threads 18 which are adapted to mate with the corresponding and complementary external two-step thread 19 on the double-ended pin member 20, whose similar threaded portions 21 are of less outside diameter than its central, body portion 22a. Each box is provided with an external, conical shoulder 22 and an internal conical shoulder 23, which shoulders are, respectively, opposed and complementary to external conical shoulder 24 and internal conical shoulder 25 on the corresponding end of pin member 20.

There is thus provided a quick make-and-break joint between adjacent pipe lengths 12, the utility of which is well recognized by those familiar with the art. In the type of joint here shown, the spacing between internal and external shoulders of each member is very accurately gauged and their relation to the threads is accurately predetermined so that in making up the joint there will be predetermined sequential seating of the shoulders in the manner and for the purposes set forth in the aforementioned patent.

There exists a smooth, slightly tapered and unthreaded extent 26 at the outer end of the box-bore which takes the complementary portion 27 at the base end of threaded portion 21 of pin member 20. Shoulder 24 is formed as a face of overhanging lip 28 which, with peripheral extent 27, defines a substantially V-shaped groove 28' (Fig. 4).

From the discussion in the aforementioned patent, it will be realized that mating shoulders 22 and 24 take very considerable loads during drilling operations and are critical elements of the joint both from locational and formation aspects. It follows that on re-formation or radial extension of the shoulder during reconditioning operations, or the formation of the shoulder or a part thereof on a built-up body portion, must give that shoulder such characteristics that it will take with full efficiency the severe fluid and mechanical pressural stresses and strains to which it will be exposed in use.

Typically, the pipe is preferably of a carbon steel with some manganese content, or other alloys of this general character, while the pin member is usually made of a higher grade alloy containing nickel and chromium. The pin members are very carefully heat treated and their body and threaded portions are given quite narrowly limited degrees of hardness, with the range of hardness for the threaded portions being considerably higher than that of the body portions, due to the difference in the nature of the duty imposed on these portions.

With the joints fashioned as above, it will be seen that they represent protuberances on drill stem 10 and thus, as the rotating string engages the rock or earth structure defining bore 11, such protuberances are exposed to excessive wear, with the serious results set forth in the forepart of this specification. This wear is aggravated by the highly abrasive action of the external rotary mud and mixed cuttings which flow upwardly around the drill pipe.

While wear may occur relatively evenly about the entire periphery of the joint, it is much more apt to be localized on a particular side, and I have schematically illustrated in Fig. 1 a situation wherein such localized wear occurs and, merely for illustrative purposes, have assumed in the later discussion that the reconditioning is to care for this particular type of wear. It has been found that a drill string often tends to bow somewhat as illustrated in this figure. The bowed sections oscillate or gyrate about the borewall in a direction opposite that of its drilling rotation and, as the protuberant tool joints thus pressurally engage the rough wall, they are worn down excessively on one side. The point of wear on any given joint is usually about 180° removed from the point of wear on the next worn joint.

In the forepart of the specification I have explained generally how this wear is compensated by building up joints before or after wear has occurred. I will now describe more in detail several methods of building up such joints and the joints as so built up.

In Figs. 2, 3 and 4, it is indicated that the joint-parts have been locally worn at S; in Figs. 2 and 3 the original thickness of the joint walls at these points being indicated by dot-and-dash lines.

It will be assumed that the reconditioning calls for building up both the boxes and pin portions of the joint, and we will first consider the building up of one of the boxes.

Preferably, box 15 is first externally turned down on its high side so its outer peripheral face 30 will be approximately concentric with the periphery of pipe-portion 12. Thick strip 31 of wear and abrasive resistant material, for instance chrome-molybdenum steel SAE #4140, may be tightly wound in spiral formation about the pipe as illustrated in Fig. 5 and as described in the above mentioned application Ser. No. 225,362. In any event one end 32 (Figs. 5 and 6) of the wrapping comes at least out to the free end of the box and extends inwardly a sufficient longitudinal extent to insure ample surface area to take make-up tongs.

The spiral sheath C, as thus formed, provides spaces 33 between its coils or convolutions 34, the thickness of the strip preferably being of such degree that, after final finish-machining, if any, it will restore the box to an oversize outside diameter.

Strip 31 is now integrated with box 15 and at the same time the coils of the spiral are integrated one with another by filling spaces 33 with weld material W which is preferably applied so that it penetrates the body of the box to an appreciable depth. Preferably, but not necessarily, the chosen weld material has wear-resisting qualities substantially similar to those of strip 31, though, upon occasion, the weld material may be of a harder nature, such as high manganese steel, which gives the composite sheath localized portions of extremely high wear-resistant qualities without the detrimental results which might follow if the entire sheath structure were made of this relatively brittle material.

It will be seen that the built-up portion generally indicated at B is a composite made up of the sheathing, proper, C and weld material W, the welding being only at spaced points along the box body and the built-up portion presenting a complete external facing of wear resistant material. The spacing of the weld lines limits localized welding heat to only a relatively small area of the box with consequent minimum disturbance of the box metal. Yet the weld integration is such that when the reconditioned box is subsequently placed in a drill string, and exposed to the torque and longitudinal stresses and strains incident to make-up and drilling operations, it will effectively resist the tendency of the box and sheath to be torn apart.

After the welding operation is completed, shoulder 22 is refaced as indicated by dotted lines 35 in Fig. 6 and by full lines 35' in Fig. 7. The end of sheathing C is coextensively faced at 36 to restore, in effect, the end shoulder of the box to its original condition and to render it capable of taking the duty of the original shoulder.

The box threads and internal shoulder 23 may then be re-cut as indicated in dotted lines to bring them into the same relationship to the refaced shoulder 35, 36 as they originally had to shoulder 22.

While the body portion 22a of pin member 20 may be separately built up in much the same fashion as described for the box (or as I will describe in connection with other figures) for purposes of combining several expedients in a single view it has been assumed in Fig. 8 that the threaded connection between box 14 and threaded end 21a of pin member 20 is such that it cannot be restored to provide a suitable break-joint, while the threaded end 21b can be restored to serve properly as a break-joint, though reconditioning of shoulder 24 is desirable. However, it will be understood that this showing of several expedients in one view is not to be considered as inferring that the expedients cannot be separately utilized.

After box 14 and body portion 22a of pin member 20 have been externally trued in the manner set forth above in connection with Fig. 5, strip 31a, which may have the same characteristics as strip 31, is coiled about and weld-integrated with both box and pin member in the manner described in connection with Fig. 5, the strip extending across the outer ends of opposed shoulders 22 and 24, thus permanently coupling box 14 and tool joint 20. Where the box wall is worn very thin, the weld material W (of the same character as that used for box 15) may be caused to penetrate not only box 14 but also to penetrate through the box and into the threads of pin-portion 21a, as at 41, thus integrating a portion of that part of strip 31a which overlies box 14, with pin-portion 21a as well as with the box.

Strip 31a extends to the right hand end of body portion 22a, and, after the welding operation is completed, shoulder 24 is re-faced as at 42 while the end of sheathing C', representing, with weld material W a built-up portion B', is co-extensively faced at 43 (Fig. 9) to provide, with refacing 42, a full shoulder of substantially the same extent as that of the original shoulder 24 and adapted effectively to take all the loads originally taken by that shoulder 24. The threads and internal shoulder 25 on pin-portion 21b may then be re-cut as indicated in dotted lines (Fig. 8) to associate them properly with shoulder 42, 43, thus restoring the entire pin end, in all effect, to its original condition. Sheath 31a may be chamfered back at 43a where it extends radially beyond the original radial extent of shoulder 24.

The weld-integration of the sheathing with box 14 and pin member 20, and the sheathing itself, have all the beneficial effects spoken of in connection with Fig. 6. It also is to be noted that the spaced-point welding of the sheath to the body portion 22a of pin member 20, will not harmfully disturb the hardness characteristics of pin-portion 21b. On the other hand, the built-up portion B' takes over the external wear-duty of the body portion of the pin member, and the spaced-point weld integration does not destroy the capacity of the original pin member body to take the imposed tensile and torsional loads. And, as is true in the case of the built-up box of Fig. 6, the operation of providing the spaced-point weld-integration, does not harmfully distort the shape-characteristics of the box and pin members.

In Fig. 10 I have shown an intermediate step in effecting a reconditioning or repair of a pin member by a somewhat different method. Parts of the member which correspond to similar parts of the previously described pin member, will be given the same reference numeral, and the previously given description may be considered as applying thereto. The same is true as to figures which will be described later in the specification.

In this case, the body portion 22a has been worn or turned down to an extent which has entirely removed the lip 28 and its shoulder 24 of Fig. 4; and a sleeve 50, solid except for a series of spaced openings 51, has been tightly fitted to a body portion 22a in substitution for the spiral wrapping of Fig. 8. Sheath C'' has the same general characteristics as to thickness and wear-resistance as specified for sheath C', and it is weld-integrated to body portion 22a by weld material W applied through openings 51. The end of sleeve 50 has been weld-integrated by an annular weld 52 to body portion 22a and also to a ring 53 which is preferably made of the same material as sleeve 50 and which has previously been applied about extent 27 at the base end of pin portion 21a. The ring may be considered as sleeve material and, in effect, a part of the sheathing. Weld 52 penetrates both body portion 22a and base end of pin portion 21a. The sheath, ring and weld material may thus be considered together as making up a built-on portion B'' of wear-resistant material weld-integrated both to body portion 22a and the base end of pin portion 21a.

Figure 12:
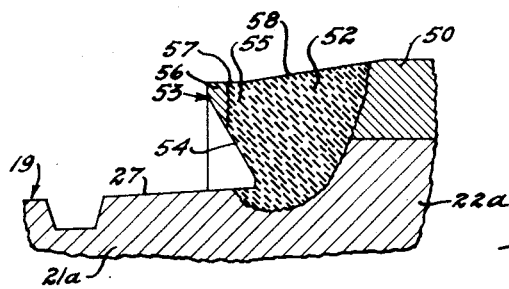
Fig. 12 is a fragmentary, enlarged detail of Fig. 11.

The joint is then machined to give it the final form of Figs. 11 and 12, the shoulder 54 being cut in the weld material 52 and ring 53 to form a lip 55 corresponding to lip 28 of Fig. 4. Shoulder 54 will correspond in taper and in position with respect to threads 19 and shoulder 25, to the taper and position of original shoulder 24. It will be seen that lip 55 and shoulder 54 are each made up, in part, of weld material 52 and, in part, of a relatively small portion 56 of ring 53. The top of lip 55 may, if desired, be cut down as at 57 to correspond with the original outside diameter of original lip 28, and weld 52 then turned off as at 58 to merge that diameter into the outside diameter of sleeve 50.

Shoulder 54, fashioned in this manner, is adapted to take all the loads and perform all the services of original shoulder 24.

In Fig. 13 I have shown a variational form of built-up joint member wherein a sleeve 60, generally similar to sleeve 50, is weld-integrated to body portion 22a by weld material 61 deposited in a pre-formed annular groove 62 and penetrating through the groove-bottom into the body portion. The weld deposit also penetrates the side walls of the groove, as shown.

Here, the end of sleeve 60 is weld-integrated with body portion 22a by annular weld-deposits 63 and 64 which run together at 65 along the outer face of the built-up, wear-resistant portion B''', the latter comprising the sheathing 60 and weld material 61, 63, 64 and 65. Weld material 64 penetrates both body portion 22a and the base end of pin portion 21a.

Shoulder 66 is cut in weld material 64 to correspond with original shoulder 24 both as to taper and as to position relative to threads 19 and shoulder 25. It is adapted to take the loads and perform the services of said original shoulder 24.

Figure 14:
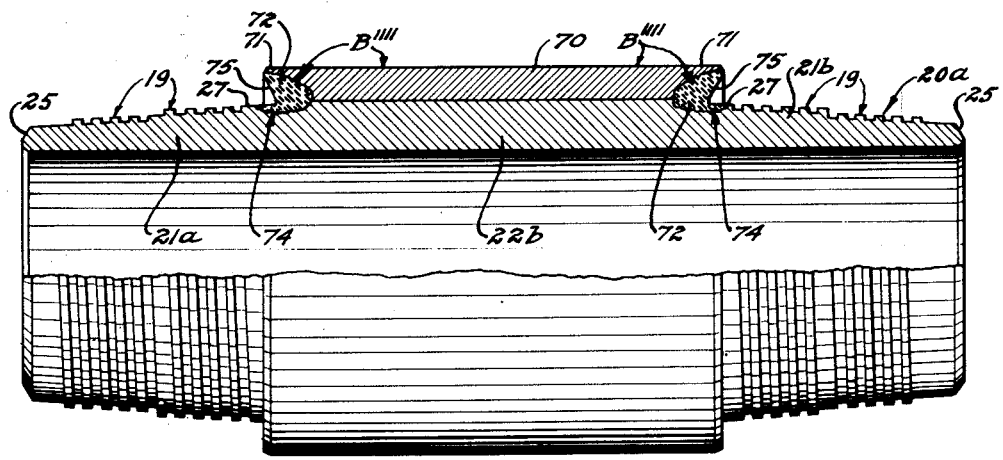
Fig. 14 is a longitudinal medial section through another type of built-up joint.

In Fig. 14 I have shown a built-up pin member 20a as it would appear if fashioned in accordance with the method set forth in my co-pending application entitled Method of making composite tool joints and the like, filed March 20, 1940, Serial No. 325,015. This method is particularly applicable, though not thus limited, to the fabrication of pin members which are originally of the composite or built-up type, and thus Fig. 14 may be considered as showing such a joint. Incidentally, I here show the outer sleeve of this joint as extending from end to end of the body portion, and shoulders corresponding to shoulders 24 of Fig. 4 at each end of the sheath. It will be understood that this same condition will normally prevail in all the previously described types of composite pin members (except in such cases as illustrated in Fig. 8 where one end-shoulder is rendered useless) though only one end shoulder has been shown in the various views in order to eliminate needless repetition.

In Fig. 14, the core or body portion 22b of pin member 20a is fashioned from a tubing of originally uniform diameter and, on the ends of which, threads 19 are cut in end portions 21a and 21b either before or after the sheathing 70 is applied.

Sheathing 70, of wear-resistant material such, for instance, as that making up sleeve 50, is tightly fitted about body portion 22b and its ends 71 are integrated by weld material 72 to that body portion. Annular welds 72 are of a nature to penetrate both sheath 70 and body portion 22b relatively deeply in a direction longitudinally of the joint member and they also penetrate both sheath and body portion through considerable radial extents. As a result the two end-welds 72, though spaced apart approximately the length of the sheathing, are of such a secure nature that they normally obviate the necessity of any intermediate welds.

Weld material 72 also penetrates the base ends of pin portions 21a and 21b at 74, thus weld-integrating the sheathing to these portions as well as to body portion 22b.

Shoulders 75 are cut in welds 72 and, if the weld has not penetrated the sheathing to its outer peripheral face, said shoulders may include a small extent of sheath-material. In any event, shoulders 75 will be of such taper and will be so located with respect to threads 19 and shoulders 25, that they will take the loads and perform the services previously ascribed to shoulders 24.

The built-up portion B'''', made up of sheathing 70 and weld material 72, is thus weld-integrated to the core in a manner effectively to withstand the severe service conditions of which I have spoken.

I have shown in all the various embodiments of the invention, mating shoulders having conical characteristics. This is because I chose the "Hydril" type of tool-joint as an illustrative basis. But this is not to be taken as an indication that the invention is limited against joint-formations where these conical characteristics do not exist, for the invention is used to advantage in such cases also. Therefore such of my claims as do not call for such characteristics are not to be considered as limited thereto.

While I have shown several preferred embodiments of my invention, it will be understood various changes may be made in design, structure, and arrangement, without departing from the spirit and scope of the claims appended hereto.

I claim:

1. In a composite tool-joint pin member, a tubular piece comprising a body portion and a coaxial threaded portion of relatively reduced diameter at one end of the body portion, an annular, built-up portion fitted tightly about and extending longitudinally of the body portion from a point near the base end of the threaded portion, said built-up portion comprising a sheath of wear-resistant metal and spaced welds which integrate the sheath and body at points spaced longitudinally of their co-extent, one of said welds occurring as an annulus near the base end of the threaded portion, said annular weld penetrating both the body portion and the base end of the threaded portion, and an exposed truly faced, annular seating shoulder formed by said built-up portion and comprised at least in part, of said annular weld, said shoulder being adapted to take loads of compression and torque.

2. In a composite tool joint for well pipe, a joint member embodying a tubular body having a coupling thread, an annular, built-up portion fitted tightly about and extending longitudinally of the body from a point near one end of said thread, an annular seating shoulder on the body near the other end of the thread, said built-up portion comprising a separately fabricated sheath of wear-resistant metal, a bond which integrates at least portions of the sheath and body, said sheath being of substantially uniform outside diameter throughout its longitudinal extent and representing the radially outermost projection of the joint member, and a second annular and exposed shoulder coaxial with the first mentioned shoulder and formed by the end of the sheath which is near said one end of the thread, said second shoulder being faced off true as a seating shoulder and being located at a predetermined distance from the first mentioned shoulder as measured along the axis of the member.

3. In a composite tool joint for well pipe, a joint member embodying a tubular body having a coupling thread, an annular, built-up portion fitted tightly about and extending longitudinally of the body from a point near one end of said thread, a conical seating shoulder on the body near the other end of the thread, said built-up portion comprising a separately fabricated sheath of wear-resistant metal, a bond which integrates at least portions of the sheath and body, said sheath being of substantially uniform outside diameter throughout its longitudinal extent and representing the radially outermost projection of the joint member, and a second conical and exposed shoulder coaxial with the first mentioned shoulder and formed by the end of the sheath which is near said one end of the thread, said second shoulder being faced off true as a seating shoulder and being located at a predetermined distance from the first mentioned shoulder as measured along the axis of the member, said shoulders inclining in opposite directions.

ALBERT L. STONE.

CERTIFICATE OF CORRECTION.

Patent No. 2,262,211. November 11, 1941.

ALBERT L. STONE.

It is hereby certified that error appears in the printed specification of the above numbered patent requiring correction as follows: Page 6, second column, line 10, claim 1, after the word "comprised" insert a comma; and that the said Letters Patent should be read with this correction therein that the same may conform to the record of the case in the Patent Office.

Signed and sealed this 30th day of December, A. D. 1941.

(Seal)

Henry Van Arsdale,
Acting Commissioner of Patents.